(12) United States Patent
Schultheiss et al.

(10) Patent No.: US 7,600,343 B2
(45) Date of Patent: *Oct. 13, 2009

(54) METHOD OF STIMULATING PLANT GROWTH

(75) Inventors: Reiner Schultheiss, Illighausen (CH); Wolfgang Schaden, Vienna (AT); John Warlick, Woodstock, GA (US); Robert Goeschl, Wiener Neustadt (AT)

(73) Assignee: General Patent, LLC, Marietta, GA (US)

(*) Notice: Subject to any disclaimer, the term of this patent is extended or adjusted under 35 U.S.C. 154(b) by 459 days.

This patent is subject to a terminal disclaimer.

(21) Appl. No.: 11/238,787

(22) Filed: Sep. 29, 2005

(65) Prior Publication Data

US 2006/0100551 A1 May 11, 2006

Related U.S. Application Data

(63) Continuation-in-part of application No. 11/122,154, filed on May 4, 2005, and a continuation-in-part of application No. 11/071,156, filed on Mar. 4, 2005.

(60) Provisional application No. 60/701,277, filed on Jul. 21, 2005, provisional application No. 60/621,028, filed on Oct. 22, 2004, provisional application No. 60/642,149, filed on Jan. 10, 2005.

(51) Int. Cl.
*A01G 29/00* (2006.01)
*A61H 1/02* (2006.01)

(52) U.S. Cl. ................. 47/58.1 LS; 47/58.1 SE; 47/DIG. 9; 47/DIG. 12; 601/2; 601/4; 600/437

(58) Field of Classification Search ........... 47/58.1 LS, 47/58.1 SE, DIG. 9, DIG. 12; 601/2, 4; 600/437
See application file for complete search history.

(56) References Cited

U.S. PATENT DOCUMENTS 3,703,051 A * 11/1972 Weinberger ............ 47/58.1 R 3,951,140 A 4/1976 Eggleton et al.
4,055,915 A * 11/1977 Charnoe ............... 47/58.1 R (Continued)

FOREIGN PATENT DOCUMENTS

CA 2 375 695 9/2003

(Continued)

OTHER PUBLICATIONS

In vitro germination of somatic embryos in date palm: Effect of auxin concentration and strength of MS salts by Jameel M. Al-Khayri, Current Science, vol. 84, No. 5, Mar. 10, 2003, pp. 680-683.*

(Continued)

*Primary Examiner*—Andrea M Valenti
(74) *Attorney, Agent, or Firm*—David L. King

(57) ABSTRACT

The method of stimulating a plant substance is disclosed. The method has the steps of activating a pressure pulse or an acoustic shock wave generator or source to emit pressure pulse or acoustic shock waves; and subjecting the plant substance to the pressure pulse or acoustic shock waves stimulating said plant substance wherein the substance is positioned within a path of the emitted shock waves. In one embodiment the emitted pressure pulse or shock waves are divergent or near planar. In another embodiment the emitted shock waves are convergent having a geometric focal volume of point at a distance of at least X from the source, the method further comprising positioning the substance at a distance less than the distance X from the source. The substance is a plant tissue having cells. The tissue can be a seed, zygotic embryo or somatic embryogenic culture of somatic embryos of plants. The plant may be a vegetable, tree, shrub or tuber. The tissue may be a part of the root system, a part of the stem system or a part of the leaf system. The method of stimulating includes activating the cells within the treated tissue thereby releasing growth factor proteins or other chemical compositions promoting growth and accelerating germination or plant growth.

19 Claims, 9 Drawing Sheets

U.S. PATENT DOCUMENTS

| | | | |
|---|---|---|---|
| 4,539,989 A | 9/1985 | Forssmann et al. | |
| 4,807,627 A | 2/1989 | Eisenmenger | |
| 4,905,671 A | 3/1990 | Senge et al. | |
| 5,056,260 A * | 10/1991 | Sutton | 47/59 R |
| 5,119,801 A | 6/1992 | Eizenhoefer et al. | |
| 5,174,280 A | 12/1992 | Gruenwald et al. | |
| 5,222,484 A | 6/1993 | Krauss et al. | |
| 5,419,335 A | 5/1995 | Hartmann | |
| 5,545,124 A | 8/1996 | Krause et al. | |
| 5,595,178 A | 1/1997 | Voss et al. | |
| 5,693,512 A * | 12/1997 | Finer et al. | 435/173.5 |
| 5,800,365 A * | 9/1998 | Zhong et al. | 601/4 |
| 5,819,467 A | 10/1998 | Zucker | |
| 5,950,362 A * | 9/1999 | Shors et al. | 47/61 |
| 5,999,847 A * | 12/1999 | Elstrom | 604/20 |
| 6,036,661 A | 3/2000 | Schwarze et al. | |
| 6,185,865 B1 * | 2/2001 | Soll et al. | 47/61 |
| 6,186,963 B1 | 2/2001 | Schwarze et al. | |
| 6,217,531 B1 | 4/2001 | Reitmajer | |
| 6,368,292 B1 | 4/2002 | Ogden et al. | |
| 6,390,995 B1 | 5/2002 | Ogden et al. | |
| 6,413,230 B1 * | 7/2002 | Haupt et al. | 601/2 |
| 6,453,609 B1 * | 9/2002 | Soll et al. | 47/57.6 |
| 2002/0002345 A1 | 1/2002 | Marlinghaus | |
| 2003/0074697 A1 | 4/2003 | Allen et al. | |
| 2004/0000090 A1 | 1/2004 | Miller | |
| 2004/0059265 A1 | 3/2004 | Candy et al. | |
| 2004/0162508 A1 * | 8/2004 | Uebelacker | 601/2 |
| 2005/0010140 A1 | 1/2005 | Forssmann | |
| 2005/0038362 A1 | 2/2005 | Schultheiss | |
| 2005/0044592 A1 | 2/2005 | Nelissen et al. | |
| 2005/0075587 A1 | 4/2005 | Vago | |
| 2005/0125161 A1 | 6/2005 | Cairney et al. | |
| 2005/0150012 A1 | 7/2005 | Schmulling et al. | |
| 2006/0051328 A1 | 3/2006 | Johnson | |

FOREIGN PATENT DOCUMENTS

| | | |
|---|---|---|
| DE | 197 21 218 A1 | 11/1998 |
| DE | 103 11 659 | 9/2004 |
| EP | 0 243 947 A1 | 4/1987 |
| EP | 0 324 711 A2 | 1/1989 |
| EP | 1 445 758 | 8/2004 |
| GB | 2 189 673 A | 11/1987 |
| WO | WO 2005/018600 A2 | 3/2005 |
| WO | WO 2005/063334 A1 | 7/2005 |
| WO | WO 2005/075020 | 8/2005 |

OTHER PUBLICATIONS

R.Meirer, et al; Extracorporal shock wave may enhance skin flap survival in an animal model; British Journal of Plastic Surgery; vol. 58, Issue 1, Jan. 2005, pp. 53-57; Copyright 2004; The British Association of Plastic Surgeons, published by Elsevier Ltd.

T. Nishida, et al; Extracorporeal Cardiac Shock Wave Therapy Markedly Ameliorates Ischemia-Induced Myocardial Dysfunction in Pigs in Vivo; Circulation; Nov. 9, 2004; Circulation. 2004; 110; pp. 3055-3061.

L.Gerdesmeyer, et al; Antibacterial Effects of Extracorporeal Shock Waves;World Fed for Ultrasound in Medicine & Biology;printed USA;Elsevier, vol. 31, No. 1, pp. 115-119, 2005.

G. Haupt, et al; Effect of Shock Waves on the Healing of Partial-Thickness Wounds in Piglets; Journal of Surgical Research, vol. 49, No. 1, pp. 45-48, Jul. 1990 Copyright 1990 by Academic Press, Inc.

Jagadeesh, G. et al;"Novel applications of micro-shock waves in biological sciences", J. Indian Inst. Sci. 2002, 82, pp. 1-10.

Thiel, M. et al; "The use of shock waves in medicine—a tool of the modern OR; an overview of basic physical principles, history and research", Min Invas Ther & Allied Technol 2000; 9(3/4) 247-253.

Huemer, Georg M. et al; "Comparison of the effectiveness of gene therapy with transforming growth factor-B or extracorporal shock wave therapy to reduce ischemic necrosis in an epigastric skin flap model in rats"; From the Clinical Department of Plastic and Reconstructive Surgery, Cardiac Surgery, Orthopedics, and the Ludwig-Boltzmann Institute for Quality Control in Plastic Surgery, Medical University Innsbruck Austria; Feb. 13, 2004; copyright 2005 by the Wound Healing Society. ISSN: 1067-1927 (Wound Rep Reg 2005;13:262-268).

* cited by examiner

METHOD OF STIMULATING PLANT GROWTH

RELATED APPLICATIONS

This application is a continuation in part of U.S. patent application Ser. No. 11/122,154 filed on May 4, 2005 entitled "Pressure Pulse/Shock Wave Therapy Methods and an Apparatus for Conducting the Therapeutic Methods" and U.S. patent application Ser. No. 11/071,156 filed on Mar. 4, 2005 entitled "Pressure Pulse/Shock Wave Apparatus for Generating Waves Having Nearly Plane or Divergent Characteristics" and also claims benefit of priority to U.S. Provisional Patent Application Ser. No. 60/701,277 filed Jul. 21, 2005, U.S. Provisional Patent Application Ser. No. 60/621,028 filed Oct. 22, 2004 and of U.S. Provisional Patent Application Ser. No. 60/642,149 filed Jan. 10, 2005, the disclosures of which are incorporated herein by reference in their entirety.

FIELD OF THE INVENTION

The present invention relates to a method for stimulating plant growth generally and more particularly to a method to accelerate embryonic stimulation and germination of seeds or somatic embryogenesis formation of plant clones.

BACKGROUND OF THE INVENTION

Plants are cellular tissue laden organisms having a genetic code for each plant within each species and plant variety. Within these genetic codes are variations or alterations which affect growth rates, yield and disease resistance.

Plants provide a large source of food, clothing, building supplies, paper products and medicines not to mention landscaping and beauty.

Rainforests contain no less than 60% of all higher plant species known on earth and they provide all that is needed for human survival, including remedies for disease. Their highly complex molecular structures often surpass the imagination of the chemical scientist and cannot easily be reproduced in the laboratory. More than 25% of all prescription drugs in Organisation for Economic Cooperation and Development (OECD) countries (contrasted with 60% in Eastern Europe) prove to consist of unmodified or slightly altered higher plant products. Natural drugs and medicinal plants, along with other non-timber forest products, already yield an important economic value. These few examples should make one realize how much modern drug delivery depends on sustainability and how vulnerable it is to the exhaustion of natural resources.

Plants are the source of many of our most important pharmaceuticals. Despite this, we know little about optimizing the production of these valuable secondary products in whole plants or cell and tissue cultures. Cultural practices to optimize pharmaceutical production in field or greenhouse grown plants have not been rigorously determined or have been of little benefit in increasing levels of the desired compounds. Considerable effort has been made to generate plant-derived pharmaceuticals economically in plant cell or tissue culture, with relatively few successes. As a result there is an apparent need to naturally stimulate growth and reproduction of these valuable plant species. The secret or key to continuing growth of such genetically complex plants will most likely occur by stimulation of growth factors within the plant's own tissues.

Commercially plants and plant products generate many hundreds of billions of dollars of commercial activity per year.

World demand for plant products is increasing very rapidly. The world demand for paper in 1997 was expected to increase by 50% by the year 2010. This places a huge demand on the timber industry which is concurrently seeing a surge in world demand for lumber products.

Trees like all of our plant products are renewable and in order to keep pace with increasing demands, faster growing and maturing trees are needed to avoid rapid deforestation on a worldwide basis.

Plants generally are taken somewhat for granted particularly in their role of influencing climate changes. Singularly no other species has a more positive role in affecting the global environment.

US patent publication 2005/0125161 A1 entitled "Differentially-Expressed Conifer cDNAS, and Their Use In Improving Somatic Embryogenesis" assigned to Institute of Paper Science and Technology provides a useful insight into current trends in coniferous trees and discloses a relational database of cDNA molecules, including those corresponding to Loblolly Pine Major Intrinsic Protein (MIP), which are differentially expressed during plant embryogenesis. The invention further related to the use of DNA arrays for evaluating gene expression in somatic and zygotic embryos. The invention encompassed related nucleic acids, proteins, antigens, and antibodies derived from these cDNAs as well as the use of such molecules for the staging, characterization, and manipulation of plant embryogenesis, in particular conifer embryogenesis. The cDNAs and related nucleic acids, proteins, antigens, and antibodies derived from these cDNAs are useful in the design, selection, and cultivation of improved crops, specifically including coniferous trees, which provide raw materials for paper and wood products.

Similarly, in US 2003/0074697 A1 entitled "Cotton Plants with Improved Cotton Fiber Characteristics and Methods for Producing Cotton Fibers From These Cotton Plants", the inventors extensively studied the mechanisms of fiber elongation and formation in cotton plants from the viewpoints of molecular biology to improve the characteristics of cotton fibers. As a result, they found that this purpose can be attained by introducing a gene coding for endoxyloglucan transferase, which is deeply associated with the cell elongation and greatly expressed in the cotton fibers and ovule tissues at the cotton fiber elongation stage, or a gene coding for catalase or peroxidase, which is a hydrogen peroxide eliminating enzyme, into cotton plants and over-expressing these genes in the cotton fiber cells.

The result is a finer cotton fiber with a resultant higher yield. In this patent these benefits are achieved in an early stage by detection of a positive hybridization signal only from cDNA probe prepared from the ovules on the fifth day of flowering.

In US 2005/0044592 entitled "Plant Growth Modulation" teaches the use of one or more genes, encoding a protein of the elongator complex to modulate plant growth wherein there results an over expression of the DRL-1 gene to stimulate growth of leaves and roots, the subject matter of this publication being incorporated herein by reference in its entirety.

As in the other patents, stimulation occurs at the embryonic or early stage of plant development while the resultant growth modulation can occur throughout the life of the plant.

To better understand the fundamental aspects of the present invention the complexities of plants generally should be appreciated. In the background of US 2005/0044592 a summary of plant development is recited which reports findings of a variety of plant scientists which is repeated below.

Plants develop mainly post-germination from an embryo with a rudimentary body plan. The embryonic apical-basal axis is delineated by apical meristems that determine the future growth direction of the organism. The embryonic radial axis determines the identity and arrangement of tissues in concentric layers. During development pattern formation, growth and differentiation are overlapping rather than consecutive events. These processes are reiterated throughout the life cycle upon formation of every new organ. Axis formation is the basis for pattern formation within the whole plant body, an organ or even a tissue.

In *Arabidopsis*, leaves initiate post-germination at specific positions at the periphery of the shoot apical meristem according to a radial pattern imposed by the plant hormone auxin (Reinhardt et al., 2000). The repression of the homeobox gene SHOOT MERISTEMLESS and the activation of the myb gene ASYMMETRIC (AS) are crucial for leaf initiation (Long et al., 1996; Byrne et al., 2000). AS imposes a dorsi-ventral asymmetry upon the radial symmetry of the leaf primordium (Byrne et al., 2000). Dorsal identity in the leaf blade is promoted by the PHABULOSA and PHAVOLUTA transcription factors (TF) (McConnell et al., 2001) and ventral identity by the YABBY and KANADI TFs (Siegfried et al., 1999; Sawa et al., 1999; Kerstetter et al., 2001). Four tissues are specified along the dorsi-ventral axis: the upper epidermis and palissade parenchyma with dorsal identity, the spongy parenchyma and the lower epidermis with ventral identity.

In the primary root the radial axis of the radicle (embryonic root) is reinforced by positional information that originates from the top to the bottom, i.e. from mature cells to initial cells (van den Berg et al., 1995) and polar auxin transport (Sabatini et al., 1999). Tissues are arranged in concentric layers: the epidermis, the cortex, the endodermis, the pericycle and the vascular bundle. SCARECROW and SHORT ROOT are important genes for cortex specification (Scheres et al., 1995; Di Laurenzio et al., 1996), TORNADO 1 & 2 are important for epidermis specification (Cnops et al., 2000). Pattern formation in the primary root epidermal cell layer results in root hair cell files alternating with non-hair cell files which are formed at the anticlinal wall of two underlying cortex cells (Dolan et al., 1993, 1994). The gaseous hormone ethylene and auxin positively regulate root hair cell identity (Masucci et al., 1996). TRANSPARENT TESTA GLABRA1 and CAPRICE are positive regulators of root hair cell identity; GLABRA2 is a negative regulator (Di-Cristina et al., 1996; Wada et al., 1997; Walker et al., 1999).

The shoot apical meristem is essential for the formation of the vegetative plant body. Regulated cell division activity and changes in the orientation of cell plates precede the initiation of leaf primordia. Growth of leaf primordia occurs mainly along the length (proximo-distal axis) and width (centro-lateral axis) direction and is restricted along the thickness (dorsi-ventral axis) direction because of pattern formation in tissue layers. Early growth processes in leaves occur mainly by anticlinal cell divisions leading to the sheet-like structure of the blade. These growth processes are coupled with dorsi-ventral pattern formation (Siegried et al., 1999; McConnell et al., 2001; Eshed et al., 2001). Late growth occurs by cell expansion processes (Tsuge et al., 1996; Kim et al., 1998). Pattern formation in lateral growth results in the distinction between lamina and petiole (van der Graaff et al., 2000). Restriction of growth determines the final shape and size of the leaf organ. At flower induction, the SAM changes identity to an inflorescence meristem of which the structure and activity resembles that of the SAM except it produces floral meristems as lateral organs instead of leaf primordia. The onset of cell division in plants and animals is controlled at the G1/S transition of the cell cycle by the retinoblastoma protein that in a hypo-phosphorylated state binds and inactivates the general transcription factors E2F. Upon a mitogenic signal, such sucrose or cytokinin activated cyclin D/CDK complexes hyper-phosphorylate retinoblastoma and derepress E2F. By preventing cell cycle entry into S-phase, retinoblastoma plays a role in cell differentiation as well (de Jager and Murray, 1999). The cross-talk between cell cycle progression and developmental programs is a new and exciting area of research and the first reports have been published (Gaudin et al., 2000; De Veylder et al., 2001). Regulation of gene expression at the transcriptional level is an important and universal mechanism of controlling developmental programs. Classes of specific TFs recognize upstream promoter boxes in specific sets of genes. Through direct or indirect interaction with the general TFs the RNA polymerase II (RNAPII) transcription initiation complex is either activated or repressed. The specific TFs are activated by environmental or developmental stimuli that are transduced from the cell plasma membrane into the nucleus. Evidence in yeast and humans is accumulating that the control of expression of sets of genes is also mediated by the process of transcription elongation. The RNAPII transcription elongation complex forms the unfolded structure of transcribing nucleosomes (Walia et al., 1998). The elongation reaction is stimulated by a large variety of factors of which some prevent pausing or stalling of the RNAPII complex and others model the chromatin for transcription. The degree of chromatin condensation is modulated by histone acetyltransferases and deacetylases (Walia et al., 1998; Wittschieben et al., 1999). Elongating RNAPII holoenzyme co-purified with a multisubunit complex, Elongator, whose stable interaction is dependent on the hyper-phosphorylated state of the RNAPII carboxy-terminal domain (Otero et al., 1999). The elongator complex consists of two subcomplexes: one consists of ELP1 (Otero et al., 1999), ELP2, a WD40 repeat protein (Fellows et al., 2000) and ELP3, a histone acetyltransferase (Wittschieben et al., 1999), the other one of ELP4, ELP5, and ELP6 (Krogan and Greenblatt, 2001; Winkler et al., 2001). Most components of Elongator are well conserved from yeast to man (Hawkes et al., 2001). Phenotypes of elpA mutants in yeast were slow growth adaptation, slow gene activation and temperature sensitivity and demonstrated that the ELP genes play a role in the activation of inducible genes in the adaptation to new growth conditions (Wittschieben et al., 1999; Otero et al., 1999; Fellows et al., 2000; Krogan and Greenblatt, 2001; Winkler et al., 2001). Mutations in man in one of the Elongator components cause familial dysautonomia, a well-known disorder (Hawkes et al., 2001). We identified the DEFORMED ROOT AND LEAF1 (DRL1) gene, a homolog of the yeast TOT4/KT112 gene (Butler et al., 1994; Frohloff et al., 2001). TOT genes were identified in search of mutants resistant to the *Kluyveromyces lactis* toxin zymocin. TOT1, TOT2, and TOT3 are isoallelic to ELP1, ELP2 and ELP3 and hence TOT equals elongator. TOT4/KT112 encodes a protein that associated with the elongator complex (Frohloff et al., 2001). The tot4 mutant displays similar phenotypes as deficient elongator mutants, in addition to slow growth, G1 cell cycle delay and hypersensitivity to Calcofluor White and caffeine. The inventors in US 2005/0044592 demonstrated that in higher plants DRL1 is important for pattern formation and growth processes.

The above related findings demonstrate that plants undergo a systemic response via a form of cross talk or cellular communication. This finding is consistent with a similar cellular communication found in mammals. In each organism be it a plant or mammal, cellular stimulation can result in a release of proteins and other chemical compositions relating to growth factors.

In attempts to activate such growth stimulations U.S. Pat. No. 5,819,467 entitled "Method of Stimulating Plant Growth" a conductive helical coil was spaced around a stem of a growing plant to stimulate growth by inducing an electromotive force or EMF.

Similarly in Canadian patent application CA 2 375 695 entitled "An Invention to Enhance Plant Growth and Germination" proposed growth and germination of some species of plants may be enhanced by exposure to a static magnetic field wherein permanent magnets were placed in a bank or array near the plants.

The present invention also has the object of stimulating plant growth and accelerating seed germination which is summarized as follows.

SUMMARY OF THE INVENTION

The method of stimulating a plant substance is disclosed. The method has the steps of activating a pressure pulse or an acoustic shock wave generator or source to emit pressure pulse or acoustic shock waves; and subjecting the plant substance to the pressure pulse or acoustic shock waves stimulating said plant substance wherein the substance is positioned within a path of the emitted shock waves. In one embodiment the emitted pressure pulse or shock waves are divergent or near planar. In another embodiment the emitted shock waves are convergent having a geometric focal volume of point at a distance of at least X from the source, the method further comprising positioning the substance at a distance less than the distance X from the source. The substance is a plant tissue having cells. The tissue can be a seed, zygotic embryo or somatic embryogenic culture of somatic embryos of plants. The plant may be a vegetable, tree, shrub or tuber. The tissue may be a part of the root system, a part of the stem system or a part of the leaf system. The method of stimulating includes activating the cells within the treated tissue thereby releasing growth factor proteins or other chemical compositions promoting growth and accelerating germination or plant growth.

Definitions

"Altered expression of a gene" means that in the genetically modified plant an amount of messenger RNA is produced that is significantly different from an untransformed control plant, grown under the same conditions.

"Coding sequence" is a nucleotide sequence, which is transcribed into mRNA and/or translated into a polypeptide when placed under the control of appropriate regulatory sequences. The boundaries of the coding sequence are determined by a translation start codon at the 5'-terminus and a translation stop codon at the 3'-terminus. A coding sequence can include, but is not limited to mRNA, cDNA, recombinant nucleotide sequences or genomic DNA, while introns may be present as well under certain circumstances.

A "curved emitter" is an emitter having a curved reflecting (or focusing) or emitting surface and includes, but is not limited to, emitters having ellipsoidal, parabolic, quasi parabolic (general paraboloid) or spherical reflector/reflecting or emitting elements. Curved emitters having a curved reflecting or focusing element generally produce waves having focused wave fronts, while curved emitters having a curved emitting surfaces generally produce wave having divergent wave fronts.

"Divergent waves" in the context of the present invention are all waves which are not focused and are not plane or nearly plane. Divergent waves also include waves which only seem to have a focus or source from which the waves are transmitted. The wave fronts of divergent waves have divergent characteristics. Divergent waves can be created in many different ways, for example: A focused wave will become divergent once it has passed through the focal point. Spherical waves are also included in this definition of divergent waves and have wave fronts with divergent characteristics.

"Embryo" a discrete mass of cells with a well defined structure that is capable of growing into a whole plant.

"Extracorpreal" occurring or based outside the living body or plant structure.

"Functional fragment of a gene" refers to a fragment of a gene that can be used in a functional way. Typical functional fragments are the promoter region and the coding sequence. However, the term refers also to parts of the coding sequence that encode for a functional fragment of the protein, i.e. a domain of the protein that is functional on its own.

"Functional fragment of the protein," as used herein, refers to a fragment of the protein that, on its own or as part of a fusion protein still retains the possibility to modulate plant growth. Typical functional fragments are fragments essential for the protein-protein interaction in the elongator complex. Specifically for DRL1, functional fragments are the conserved domains from AA 56 to 94, from AA 138 to 159 (including a GTPase G4 consensus motif) and from AA245 to 265, the ATP/GTP binding domain from AA 8 to 15, and the Calmodulin-binding domain, comprising AA 258 to 272, preferentially comprising AA 249 to 276, more preferentially comprising the C-terminal 100 AA. A preferred embodiment is a functional fragment comprising SEQ ID NO:16, preferably consisting essentially of SEQ ID NO:16, even more preferably consisting of SEQ ID NO:16.

"Gene," as used herein, refers both to the promoter region of the gene as well as the coding sequence. It refers both to the genomic sequence (including possible introns) as well as to the cDNA derived from the spliced messenger operably linked to a promoter sequence.

A "generalized paraboloid" according to the present invention is also a three-dimensional bowl. In two dimensions (in Cartesian coordinates, x and y) the formula $y^n=2px$ [with n being ≠2, but being greater than about 1.2 and smaller than 2, or greater than 2 but smaller than about 2.8]. In a generalized paraboloid, the characteristics of the wave fronts created by electrodes located within the generalized paraboloid may be corrected by the selection of (p(−z,+z)), with z being a measure for the burn down of an electrode, and n, so that phenomena including, but not limited to, burn down of the tip of an electrode (−z,+z) and/or disturbances caused by diffraction at the aperture of the paraboloid are compensated for.

"Expression of a gene," as used herein, refers to the transcription of the gene into messenger RNA.

"Operably linked" refers to a juxtaposition wherein the components so described are in a relationship permitting them to function in their intended manner. A promoter sequence "operably linked" to a coding sequence is ligated in such a way that expression of the coding sequence is achieved under conditions compatible with the promoter sequence.

"Overexpression of a gene" means that more messenger RNA is produced in the genetically modified plant than in an untransformed control plant, grown under the same condition.

"Ovule" The body which, after fertilization, becomes the seed.

A "paraboloid" according to the present invention is a three-dimensional reflecting bowl. In two dimensions (in Cartesian coordinates, x and y) the formula $y^2=2px$, wherein p/2 is the distance of the focal point of the paraboloid from its apex, defines the paraboloid. Rotation of the two-dimensional figure defined by this formula around its longitudinal axis generates a de facto paraboloid.

"Plane waves" are sometimes also called flat or even waves. Their wave fronts have plane characteristics (also called even or parallel characteristics). The amplitude in a wave front is constant and the "curvature" is flat (that is why these waves are sometimes called flat waves). Plane waves do not have a focus to which their fronts move (focused) or from which the fronts are emitted (divergent). "Nearly plane waves" also do not have a focus to which their fronts move (focused) or from which the fronts are emitted (divergent). The amplitude of their wave fronts (having "nearly plane" characteristics) is approximating the constancy of plain waves. "Nearly plane" waves can be emitted by generators having pressure pulse/shock wave generating elements with flat emitters or curved emitters. Curved emitters may comprise a generalized paraboloid that allows waves having nearly plane characteristics to be emitted.

A "pressure pulse" according to the present invention is an acoustic pulse which includes several cycles of positive and negative pressure. The amplitude of the positive part of such a cycle should be above about 0.1 MPa and its time duration is from below a microsecond to about a second. Rise times of the positive part of the first pressure cycle may be in the range of nano-seconds (ns) up to some milli-seconds (ms). Very fast pressure pulses are called shock waves. Shock waves used in medical applications do have amplitudes above 0.1 MPa and rise times of the amplitude are below 100's of ns. The duration of a shock wave is typically below 1-3 micro-seconds ($\mu s$) for the positive part of a cycle and typically above some micro-seconds for the negative part of a cycle.

"Promoter of a gene" as used herein, refers to a functional DNA sequence unit that, when operably linked to a coding sequence and possibly placed in the appropriate inducing conditions, is sufficient to promote transcription of the coding sequence.

"A protein of the elongator complex," as used herein, means that the protein belongs to the multisubunit complex Elongator, as known to the person skilled in the art or to a protein associating with the complex. Preferentially, the protein has structural and/or functional homology with one of the proteins ELP1, ELP2, ELP3, ELP4, ELP5, ELP6 or TOT4/KT112 as described in *Saccharomyces cerevisiae*.

"seed" The ripened ovule, consisting of the embryo and its proper coats.

"Somatic Embryogenesis" a type of plant tissue culture where a piece of a donor plant is excised, cultured ad induced to form multiple embryos.

Waves/wave fronts described as being "focused" or "having focusing characteristics" means in the context of the present invention that the respective waves or wave fronts are traveling and increase their amplitude in direction of the focal point. Per definition the energy of the wave will be at a maximum in the focal point or, if there is a focal shift in this point, the energy is at a maximum near the geometrical focal point. Both the maximum energy and the maximal pressure amplitude may be used to define the focal point.

"Zygotic Embryogenesis" is a sexual or asexual reproductive process that forms new plants. The process of embryogenesis may occur naturally in the plant as a result of sexual fertilization or asexual processes, these embryos are called zygotic embryos and develop into seeds, which germinate giving rise to seedlings.

BRIEF DESCRIPTION OF THE DRAWINGS

The invention will be described by way of example and with reference to the accompanying drawings in which.

DETAILED DESCRIPTION OF THE INVENTION

Figure 1A:
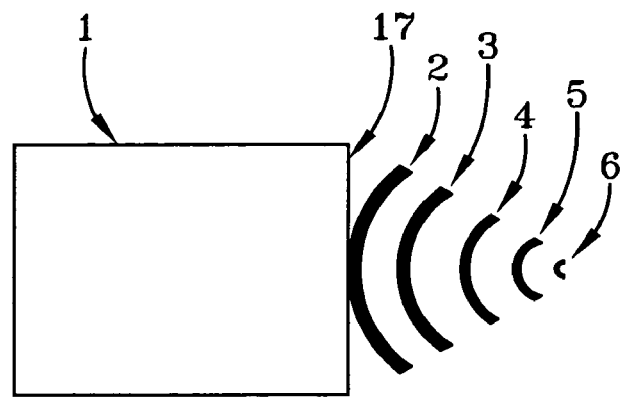
FIG. 1a is a simplified depiction of a pressure pulse/shock wave (PP/SW) generator with focusing wave characteristics.

The present invention relates to the use of various pressure pulse wave patterns or acoustic shock wave patterns as illustrated in FIGS. 1-12 for stimulating plant growth. Each illustrated wave pattern will be discussed later in the description; however, the use of each has particularly interesting beneficial features that are a remarkably valuable new tool in the effort to accelerate plant growth and production.

The present invention employs the use of pressure pulses or shock waves to stimulate a cellular response stimulating a tissue growth process that activates the tissue to initiate a systemic growth process.

In the pressure pulse or shock wave method of treating a plant tissue, a zygotic embryo or seed or somatic embryos of the plant or cultures of such embryos are positioned in a convenient orientation to permit the source of the emitted waves to most directly send the waves to the target site to initiate pressure pulse or shock wave stimulation of the target area or zone with minimal, preferably with little or no obstructing features in the path of the emitting source or lens. Assuming the treatment region is accessible through an open access region then the shock wave head 43 can be inserted and placed directly on or adjacent to the treatment region 200. Assuming the target area or site is within a projected area of the wave transmission, a single transmission dosage of wave energy may be used. The transmission dosage can be from a few seconds to 20 minutes or more dependent on the condition. Preferably the waves are generated from an unfocused or focused source. The unfocused waves can be divergent, planar or near planar and having a low pressure amplitude and density in the range of 0.00001 $mJ/mm^2$ to 1.0 $mJ/mm^2$ or less, most typically below 0.2 $mJ/mm^2$. The focused source preferably can use a diffusing lens or have a far-sight focus to minimize if not eliminate having the localized focus point within the tissue. Preferably the focused shock waves are used at a similarly effective low energy transmission or alternatively can be at higher energy but wherein the tissue target site is disposed pre-convergence inward of the geometric focal point of the emitted wave transmission. In treating some hard to penetrate regions, the pressure pulse more preferably is a high energy target focused wave pattern which can effectively penetrate through outer structures prior to being dampened while still exposing the plant to activating pressure pulses or shock waves. This emitted energy preferably stimulates the plant cells without rupturing cellular membranes. The surrounding healthy cells in the region treated are activated initiating a growth mechanism response stimulating new growth. In the case of embryonic tissues, the cells are activated stimulating accelerated germination when planted in a nutrient rich environment such as soil.

These shock wave energy transmissions are effective in stimulating a cellular response and can be accomplished without creating the cavitation bubbles in the tissue of the target site when employed in other than site targeted high energy focused transmissions. This effectively insures the tissue or plant does not have to experience the sensation of cellular membrane rupturing so common in the higher energy focused wave forms having a focal point at or within the targeted treatment site.

This method permits the lens or cover of the emitting shock wave source to impinge on the plant or tissue directly or through a transmission enhancing gel, water or fluid medium during the pressure pulse or shock wave treatment. The treated area can withstand a far greater number of shock waves based on the selected energy level being emitted. For example at very low energy levels the stimulation exposure can be provided over prolonged periods as much as 20 minutes if so desired. At higher energy levels the treatment duration can be shortened to less than a minute, less than a second if so desired. The limiting factor in the selected treatment dosage is avoidance or minimization of surrounding cell rupturing and other kinds of damage to the surrounding cells or tissue while still providing a stimulating cell activation or a cellular release or activation of proteins or functional fragments of the protein or other chemical composition that modulates growth factors.

The underlying principle of these pressure pulse or shock wave therapy methods is to enrich the treatment area directly and to stimulate the plant's own natural growth capability. This is accomplished by deploying shock waves to stimulate cells in the surrounding tissue to activate a variety of responses. The acoustic shock waves transmit or trigger what appears to be a cellular communication throughout the entire anatomical structure, this activates a generalized cellular response at the treatment site, in particular, but more interestingly a systemic response in areas more removed from the wave form pattern. This is believed to be one of the reasons molecular stimulation can be conducted at threshold energies heretofore believed to be well below those commonly accepted as required. Accordingly not only can the energy intensity be reduced in some cases, but also the number of applied shock wave impulses can be lowered from several thousand to as few as one or more pulses and still yield a beneficial stimulating response. The key is to provide at least a sufficient amount of energy to activate growth reactions. The treatment is particularly beneficial in early stages of plant growth, but also can be employed with appropriate transmission medias to treat infected or damaged mature plants such as infected trees which when subjected to shock waves activates a cellular defense response to an intrusion of for example parasitic diseases.

Ideally the present invention is best suited for large scale farming and nursery operations where seedlings are harvested in large quantities.

Figure 13:
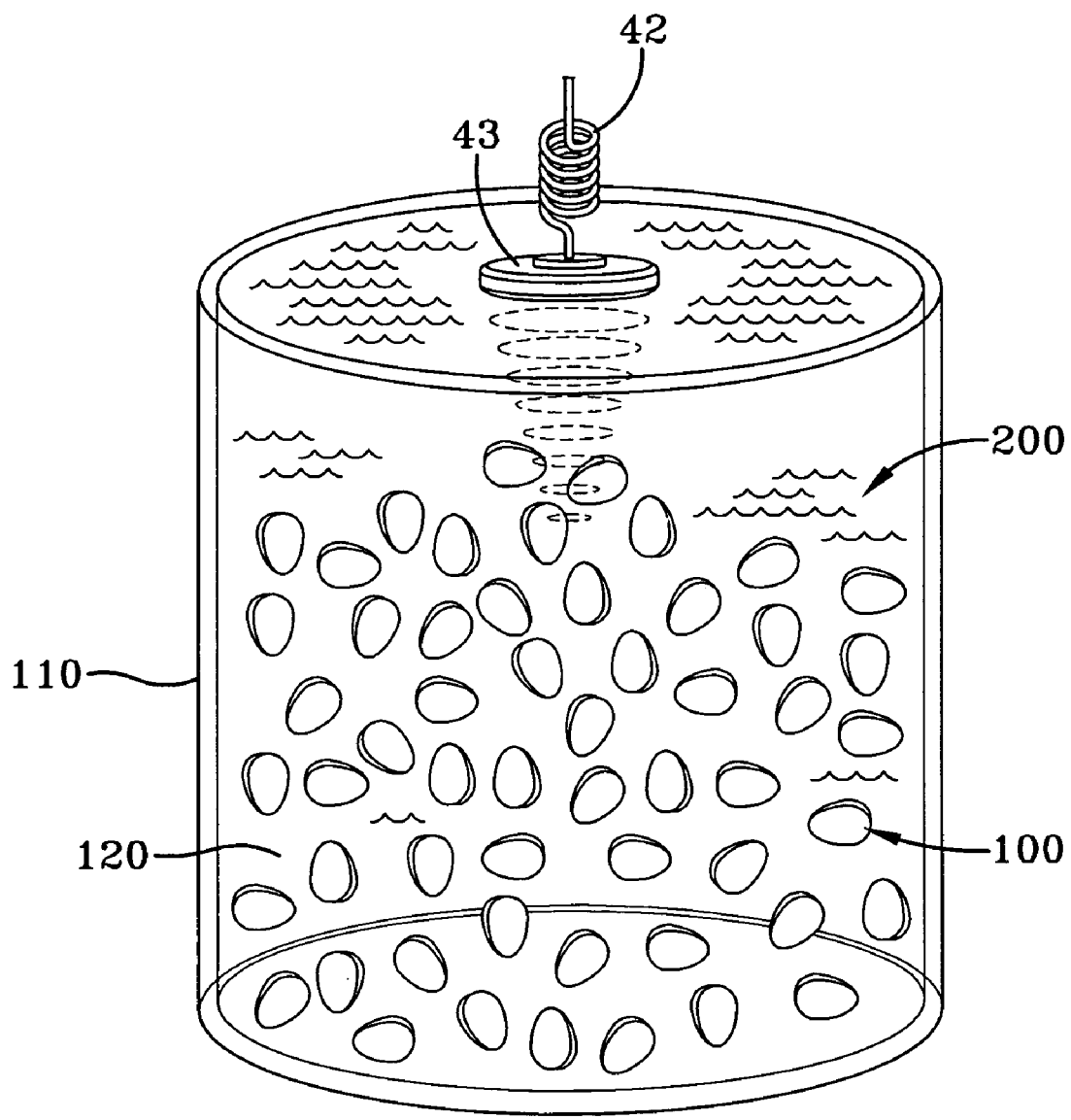
FIG. 13 shows shock waves being transmitted through a container or vat having a plurality of plant tissues to be treated.

As shown in FIG. 13 the treated plant tissue can be seeds, zygotic embryos, or somatic embryogenesis cells placed in a nutrient rich environment or culture medium which easily allows the transmitted waves to pass through each seed or cluster of embryogenic cells to trigger the growth protein modulation. Thereafter the treated plant tissues can be planted in soil or nutrient medium to initiate root generation and full germination.

In practice treated bean seeds were planted along with untreated control seeds. The treated seeds sprouted on average two days before the control seeds. This finding is consistent with the findings of a Canadian patent 2,376,695 which used an array of magnets to produce a magnetic field in proximity to the planted seeds. The distinction and benefit of the present invention is the treatment is applied one time to a mass quantity of seeds prior to planting. The cellular stimulation having been triggered no further stimulation was required. The vegetative foliage of the treated bean plants was superior in growth and appearance as well evidencing a pronounced long-term benefit.

Additional shelf life testing needs to be conducted to see if the effect of shock waves is transitory. That is how long treated seeds, embryos or seedlings can be held in storage until planting and still see the beneficial accelerated germination and improved quality of plant structure.

As further shown in FIG. 13 the pressure pulse or shock wave head 43 can be immersed in a nutrient rich fluid medium or culture 120 of zygotic embryos, seeds or somatic embryos or embryonic tissues 100. The treated tissue 100 can be one or more such embryo or seeds 100, preferably many more. As shown a large container or vat 110 is shown holding many thousands of such plant tissues 100. The shock wave head 43 is connected via cabling 42 base to a wave generator or source (not illustrated). After treating the plant tissue or seeds 100 the treated embryonic plants can be potted or planted to initiate the germination process. As can be appreciated such a process is also ideally suited for hydroponic planting processes as well. The treated plant tissues can form trees, bushes, tubers, cotton, or vegetables like soybean, corn, peanuts, beans, melons, citrus fruit trees, avocados or any other plants including grasses. The plants may be of flowering varieties or seed producing varieties such as walnut, pecan and other tree born nut producing plants. The resultant treated plant tissue may be of a plant variety which is used in manufacture of medicines or other pharmaceutical drugs. The treatment may be directed to the root system and stimulation thereof or the leaf system or stem. The treated tissue may be at a graft site or may be plant tissue of one or more zygotic embryos or one or more somatic embryos which is micro-propagated from somatic embryo in vitro from minute pieces of tissue or individual cells such as in cloning.

Assuming the treated seeds need not be potted or planted immediately then the above method could have an important role in large scale seed production. Otherwise the beneficial attributes may be better suited for nurseries and large scale planting operations wherein improved plant growth rates are financially rewarding.

Nevertheless the use of such pressure pulses and acoustic shock waves can be very beneficial to plant production in terms of accelerated growth.

FIG. 1a is a simplified depiction of the a pressure pulse/shock wave (PP/SW) generator, such as a shock wave head, showing focusing characteristics of transmitted acoustic pressure pulses. Numeral 1 indicates the position of a generalized pressure pulse generator, which generates the pressure pulse and, via a focusing element, focuses it outside the housing to treat plants or embryos of plants. The affected plant tissue is generally located in or near the focal point which is located in or near position 6. At position 17 a water cushion or any other kind of exit window for the acoustical energy is located.

Figure 1B:
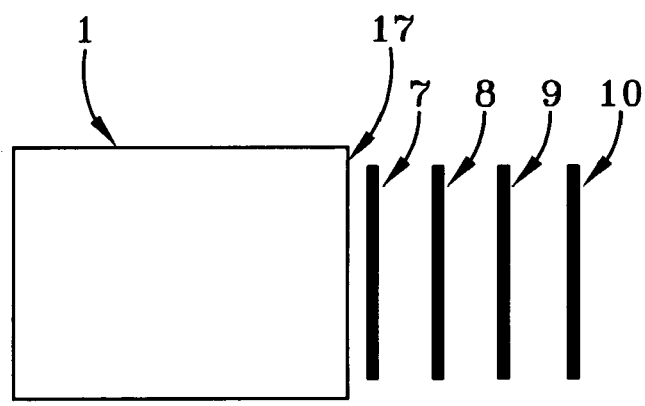
FIG. 1b is a simplified depiction of a pressure pulse/shock wave generator with plane wave characteristics.

FIG. 1b is a simplified depiction of a pressure pulse/shock wave generator, such as a shock wave head, with plane wave characteristics. Numeral 1 indicates the position of a pressure pulse generator according to the present invention, which generates a pressure pulse which is leaving the housing at the position 17, which may be a water cushion or any other kind of exit window. Somewhat even (also referred to herein as "disturbed") wave characteristics can be generated, in case a paraboloid is used as a reflecting element, with a point source (e.g. electrode) that is located in the focal point of the paraboloid. The waves will be transmitted into the plant tissue via a coupling media such as, e.g., ultrasound gel or oil or a nutrient rich fluid and their amplitudes will be attenuated with increasing distance from the exit window 17.

Figure 1C:
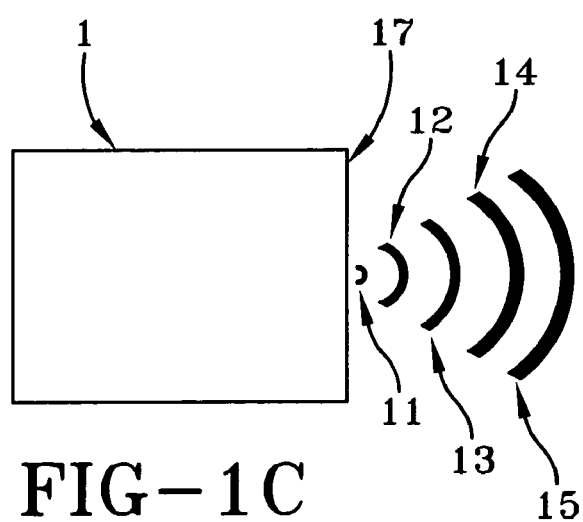
FIG. 1c is a simplified depiction of a pressure pulse/shock wave generator with divergent wave characteristics.

FIG. 1c is a simplified depiction of a pressure pulse shock wave generator (shock wave head) with divergent wave characteristics. The divergent wave fronts may be leaving the exit window 17 at point 11 where the amplitude of the wave front is very high. This point 17 could be regarded as the source point for the pressure pulses. In FIG. 1c the pressure pulse source may be a point source, that is, the pressure pulse may be generated by an electrical discharge of an electrode under water between electrode tips. However, the pressure pulse may also be generated, for example, by an explosion, referred to as a ballistic pressure pulse. The divergent characteristics of the wave front may be a consequence of the mechanical setup shown in FIG. 2b.

Figure 2A:
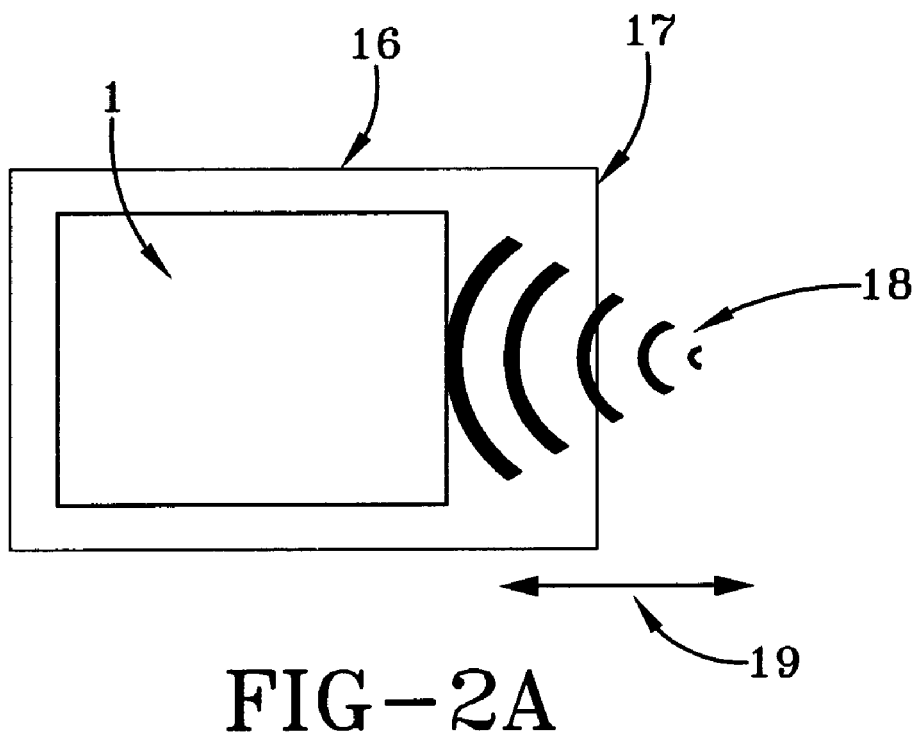
FIG. 2a is a simplified depiction of a pressure pulse/shock wave generator having an adjustable exit window along the pressure wave path. The exit window is shown in a focusing position.

FIG. 2a is a simplified depiction of a pressure pulse/shock wave generator (shock wave head) according to the present invention having an adjustable or exchangeable (collectively referred to herein as "movable") housing around the pressure wave path. The apparatus is shown in a focusing position. FIG. 2a is similar to FIG. 1a but depicts an outer housing (16) in which the acoustical pathway (pressure wave path) is located. In a preferred embodiment, this pathway is defined by especially treated water (for example, temperature controlled, conductivity and gas content adjusted water) and is within a water cushion or within a housing having a permeable membrane, which is acoustically favorable for the transmission of the acoustical pulses. In certain embodiments, a complete outer housing (16) around the pressure pulse/shock wave generator (1) may be adjusted by moving this housing (16) in relation to, e.g., the focusing element in the generator. However, as the person skilled in the art will appreciate, this is only one of many embodiments of the present invention. While the figure shows that the exit window (17) may be adjusted by a movement of the complete housing (16) relative to the focusing element, it is clear that a similar, if not the same, effect can be achieved by only moving the exit window, or, in the case of a water cushion, by filling more water in the volume between the focusing element and the cushion. FIG. 2a shows the situation in which the arrangement transmits focused pressure pulses.

Figure 2B:
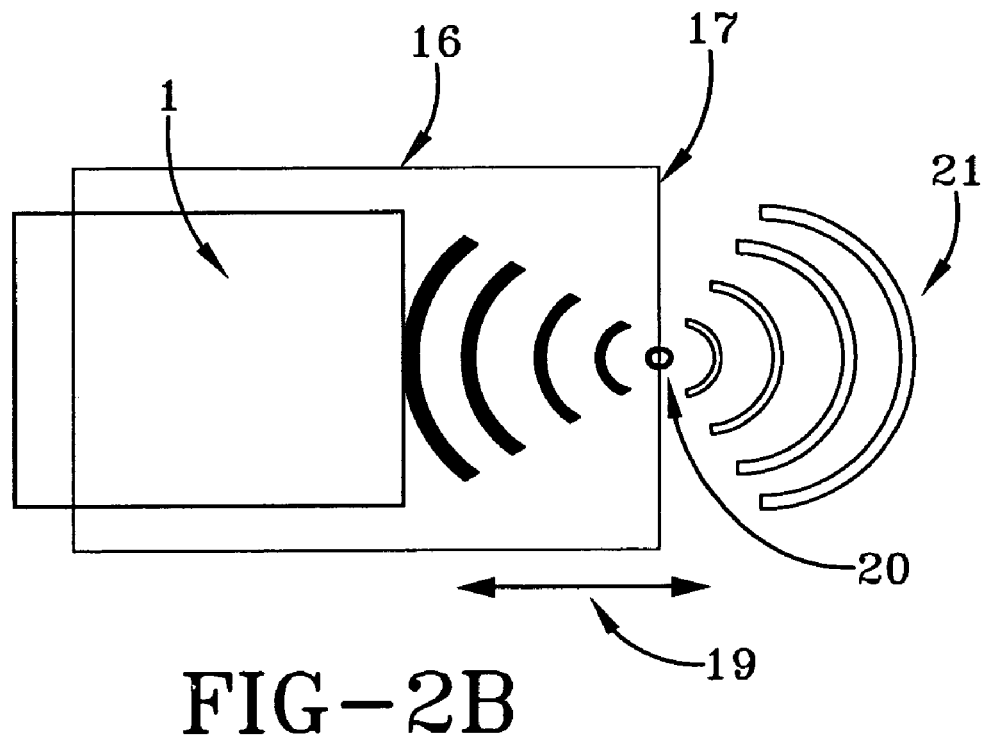
FIG. 2b is a simplified depiction of a pressure pulse/shock wave generator having an exit window along the pressure wave path. The exit window as shown is positioned at the highest energy divergent position.

FIG. 2b is a simplified depiction of the pressure pulse/shock wave generator (shock wave head) having an adjustable or exchangeable housing around the pressure wave path with the exit window 17 being in the highest energy divergent position. The configuration shown in FIG. 2b can, for example, be generated by moving the housing (16) including the exit window (17), or only the exit window (17) of a water cushion, towards the right (as shown in the Figure) to the second focus f2 (20) of the acoustic waves. In a preferred embodiment, the energy at the exit window will be maximal. Behind the focal point, the waves may be moving with divergent characteristics (21).

Figure 2C:
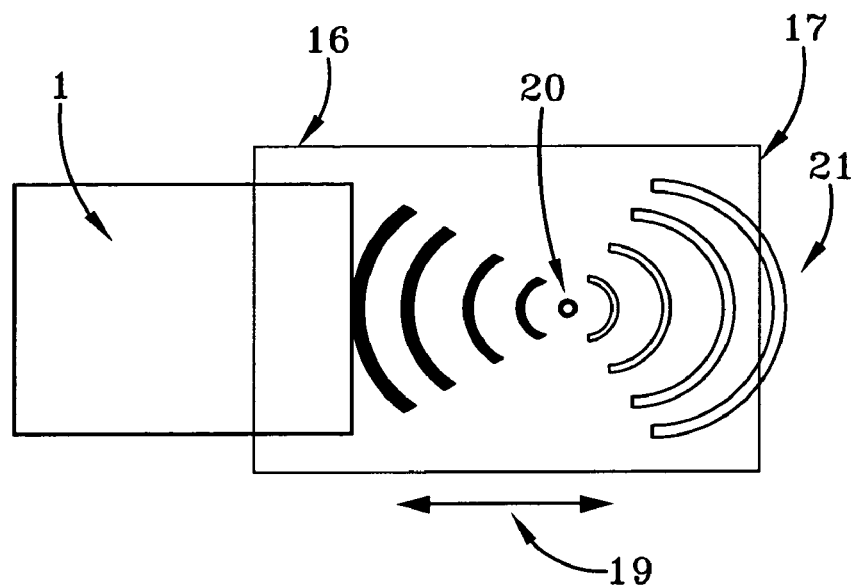
FIG. 2c is a simplified depiction of a pressure pulse/shock wave generator having an exit window along the pressure wave path. The exit window is shown at a low energy divergent position.

FIG. 2c is a simplified depiction of the pressure pulse/shock wave generator (shock wave head) having an adjustable or exchangeable housing around the pressure wave path in a low energy divergent position. The adjustable housing or water cushion is moved or expanded much beyond f2 position (20) so that highly divergent wave fronts with low energy density values are leaving the exit window (17) and may be coupled to a plant tissue. Thus, an appropriate adjustment can change the energy density of a wave front without changing its characteristic.

This apparatus may, in certain embodiments, be adjusted/ modified/or the complete shock wave head or part of it may be exchanged so that the desired and/or optimal acoustic profile such as one having wave fronts with focused, planar, nearly plane, convergent or divergent characteristics can be chosen.

A change of the wave front characteristics may, for example, be achieved by changing the distance of the exit acoustic window relative to the reflector, by changing the reflector geometry, by introducing certain lenses or by removing elements such as lenses that modify the waves produced by a pressure pulse/shock wave generating element. Exemplary pressure pulse/shock wave sources that can, for example, be exchanged for each other to allow an apparatus to generate waves having different wave front characteristics are described in detail below.

In certain embodiments, the change of the distance of the exit acoustic window can be accomplished by a sliding movement. However, in other embodiments of the present invention, in particular, if mechanical complex arrangements, the movement can be an exchange of mechanical elements.

In one embodiment, mechanical elements that are exchanged to achieve a change in wave front characteristics include the primary pressure pulse generating element, the focusing element, the reflecting element, the housing and the membrane. In another embodiment, the mechanical elements further include a closed fluid volume within the housing in which the pressure pulse is formed and transmitted through the exit window.

In one embodiment, the apparatus of the present invention is used in combination therapy. Here, the characteristics of waves emitted by the apparatus are switched from, for example, focused to divergent or from divergent with lower energy density to divergent with higher energy density. Thus, effects of a pressure pulse treatment can be optimized by using waves having different characteristics and/or energy densities, respectively.

While the above described universal toolbox of the present invention provides versatility, the person skilled in the art will appreciate that apparatuses that only produce waves having, for example, nearly plane characteristics, are less mechanically demanding and fulfill the requirements of many users.

As the person skilled in the art will also appreciate that embodiments shown in the drawings are independent of the generation principle and thus are valid for not only electrohydraulic shock wave generation but also for, but not limited to, PP/SW generation based on electromagnetic, piezoceramic and ballistic principles. The pressure pulse generators may, in certain embodiments, be equipped with a water cushion that houses water which defines the path of pressure pulse waves that is, through which those waves are transmitted. In a preferred embodiment, a plant tissue is coupled via a nutrient rich fluid, ultrasound gel or oil to the acoustic exit window (17), which can, for example, be an acoustic transparent membrane, a water cushion, a plastic plate or a metal plate.

Figure 3:
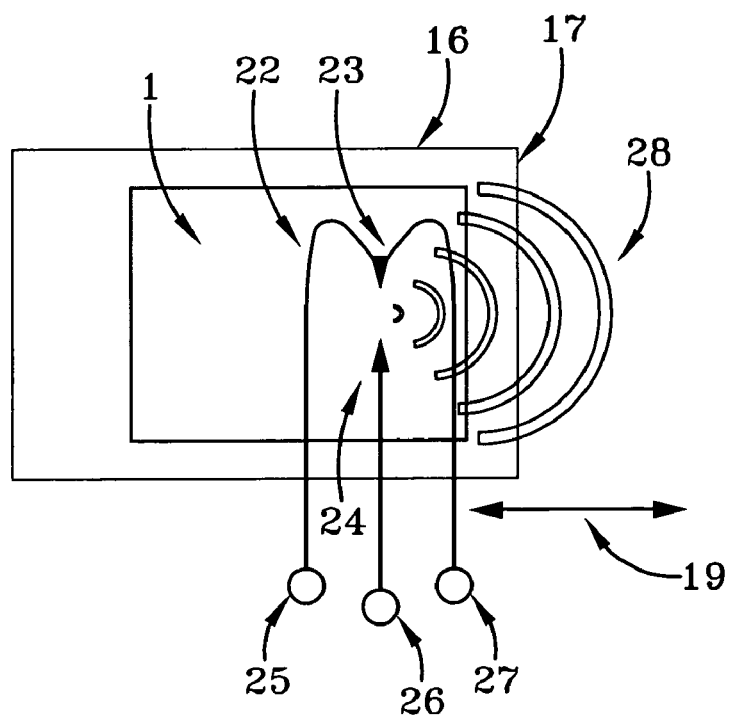
FIG. 3 is a simplified depiction of an electro-hydraulic pressure pulse/shock wave generator having no reflector or focusing element. Thus, the waves of the generator did not pass through a focusing element prior to exiting it.

FIG. 3 is a simplified depiction of the pressure pulse/shock wave apparatus having no focusing reflector or other focusing element. The generated waves emanate from the apparatus without coming into contact with any focusing elements. FIG. 3 shows, as an example, an electrode as a pressure pulse generating element producing divergent waves (28) behind the ignition point defined by a spark between the tips of the electrode (23, 24).

Figure 4A:
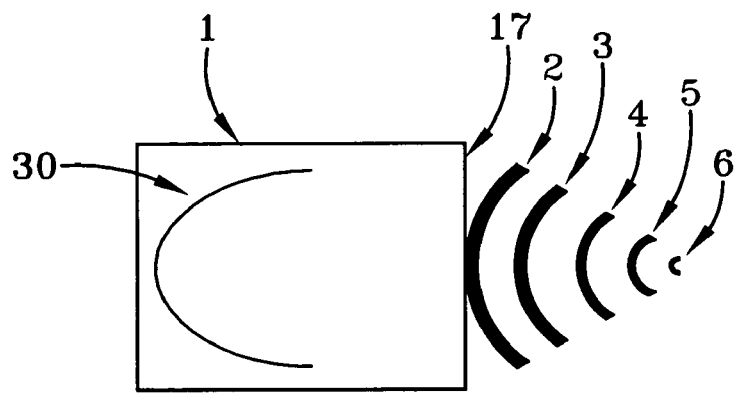
FIG. 4a is a simplified depiction of a pressure pulse/shock wave generator having a focusing element in the form of an ellipsoid. The waves generated are focused.

FIG. 4a is a simplified depiction of the pressure pulse/shock wave generator (shock wave head) having as focusing element an ellipsoid (30). Thus, the generated waves are focused at (6).

Figure 4B:
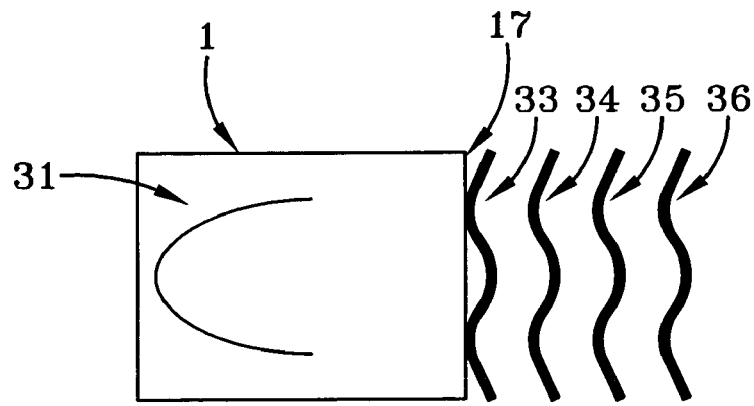
FIG. 4b is a simplified depiction of a pressure pulse/shock wave generator having a parabolic reflector element and generating waves that are disturbed plane.

FIG. 4b is a simplified depiction of the pressure pulse/shock wave generator (shock wave head) having as a focusing element an paraboloid ($y^2=2px$). Thus, the characteristics of the wave fronts generated behind the exit window (33, 34, 35, and 36) are disturbed plane ("parallel"), the disturbance resulting from phenomena ranging from electrode burn down, spark ignition spatial variation to diffraction effects. However, other phenomena might contribute to the disturbance.

Figure 4C:
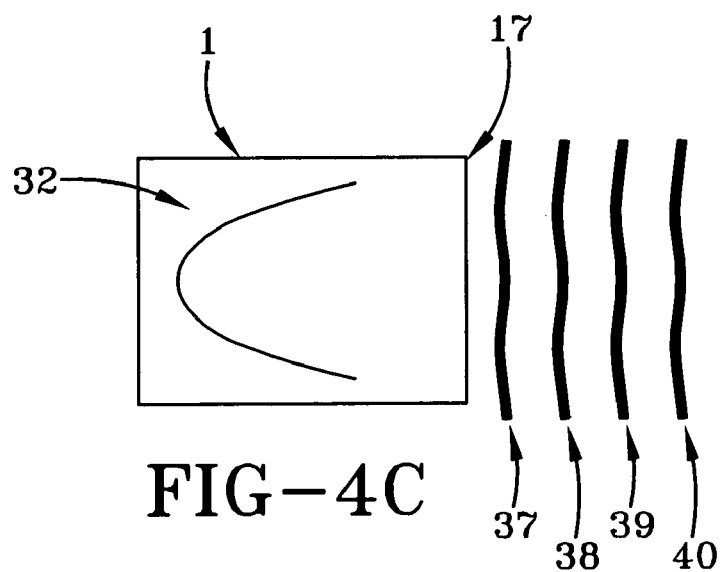
FIG. 4c is a simplified depiction of a pressure pulse/shock wave generator having a quasi parabolic reflector element (generalized paraboloid) and generating waves that are nearly plane/have nearly plane characteristics.

FIG. 4c is a simplified depiction of the pressure pulse/shock wave generator (shock wave head) having as a focusing element a generalized paraboloid ($y^n=2px$, with $1.2<n<2.8$ and $n\neq2$). Thus, the characteristics of the wave fronts generated behind the exit window (37, 38, 39, and 40) are, compared to the wave fronts generated by a paraboloid ($y^2=2px$), less disturbed, that is, nearly plane (or nearly parallel or nearly even (37, 38, 39, 40)). Thus, conformational adjustments of a regular paraboloid ($y^2=2px$) to produce a generalized paraboloid can compensate for disturbances from, e.g., electrode burn down. Thus, in a generalized paraboloid, the characteristics of the wave front may be nearly plane due to its ability to compensate for phenomena including, but not limited to, burn down of the tips of the electrode and/or for disturbances caused by diffraction at the aperture of the paraboloid. For example, in a regular paraboloid ($y^2=2px$) with p=1.25, introduction of a new electrode may result in p being about 1.05. If an electrode is used that adjusts itself to maintain the distance between the electrode tips ("adjustable electrode") and assuming that the electrodes burn down is 4 mm (z=4 mm), p will increase to about 1.45. To compensate for this burn down, and here the change of p, and to generate nearly plane wave fronts over the life span of an electrode, a generalized paraboloid having, for example n=1.66 or n=2.5 may be used. An adjustable electrode is, for example, disclosed in U.S. Pat. No. 6,217,531.

Figure 4D:
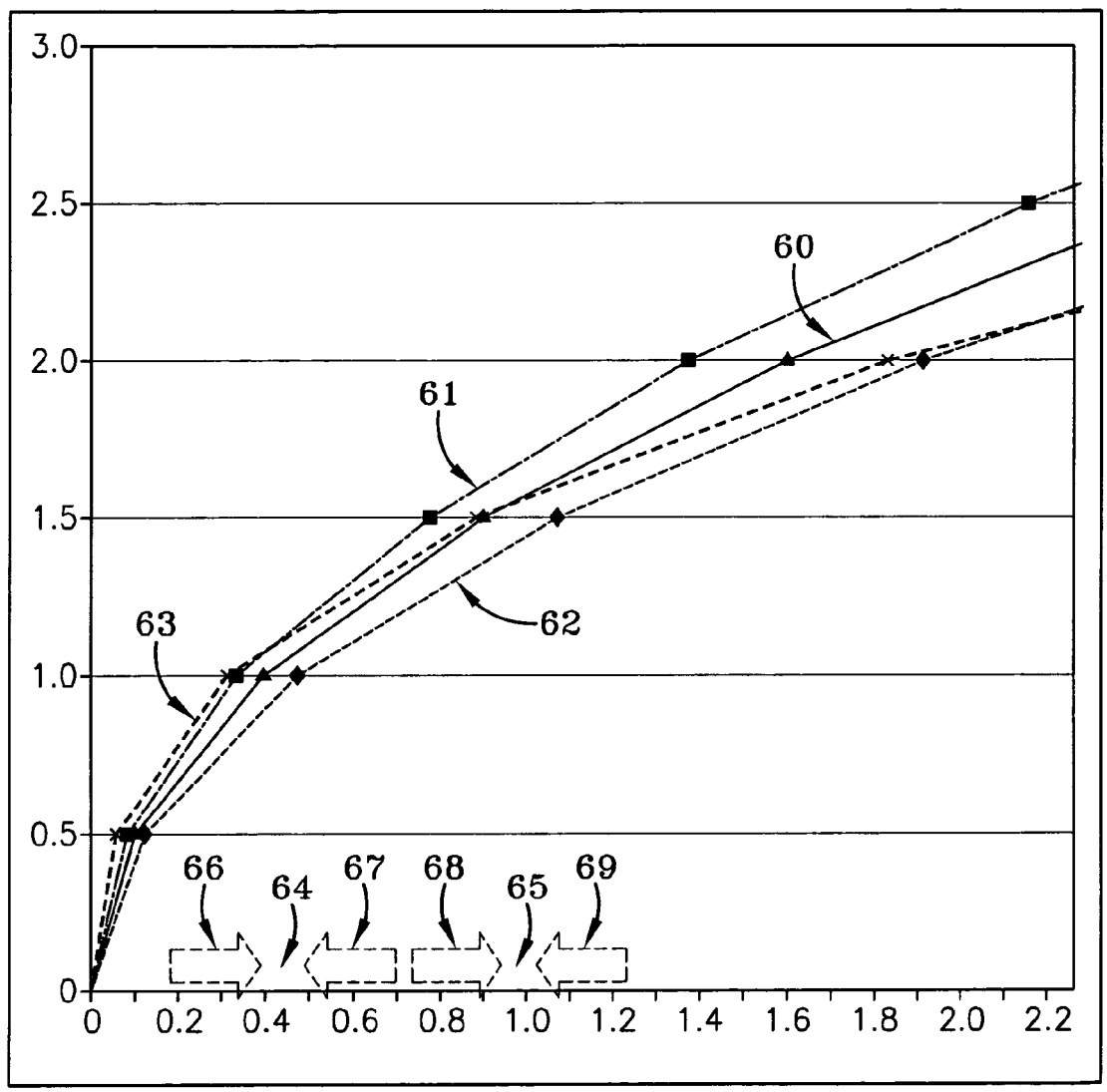
FIG. 4d is a simplified depiction of a generalized paraboloid with better focusing characteristic than a paraboloid in which n=2. The electrode usage is shown. The generalized paraboloid, which is an interpolation (optimization) between two optimized paraboloids for a new electrode and for a used (burned down) electrode is also shown.

FIG. 4d shows sectional views of a number of paraboloids. Numeral 62 indicates a paraboloid of the shape $y^2=2px$ with p=0.9 as indicated by numeral 64 at the x axis which specifies the p/2 value (focal point of the paraboloid). Two electrode tips of a new electrode 66 (inner tip) and 67 (outer tip) are also shown in the Figure. If the electrodes are fired and the tips are burning down the position of the tips change, for example, to position 68 and 69 when using an electrode which adjusts its position to compensate for the tip burn down. In order to generate pressure pulse/shock waves having nearly plane characteristics, the paraboloid has to be corrected in its p value. The p value for the burned down electrode is indicate by 65 as p/2=1. This value, which constitutes a slight exaggeration, was chosen to allow for an easier interpretation of the Figure. The corresponding paraboloid has the shape indicated by 61, which is wider than paraboloid 62 because the value of p is increased. An average paraboloid is indicated by numeral 60 in which p=1.25 cm. A generalized paraboloid is indicated by dashed line 63 and constitutes a paraboloid having a shape between paraboloids 61 and 62. This particular generalized paraboloid was generated by choosing a value of $n\neq2$ and a p value of about 1.55 cm. The generalized paraboloid compensates for different p values that result from the electrode burn down and/or adjustment of the electrode tips.

Figure 5:
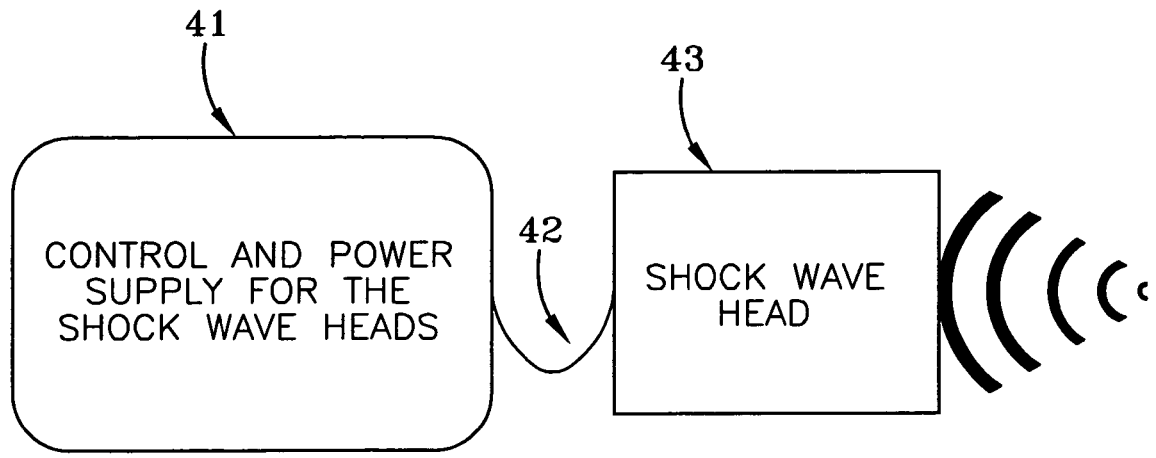
FIG. 5 is a simplified depiction of a pressure pulse/shock wave generator being connected to a control/power supply unit.

FIG. 5 is a simplified depiction of a set-up of the pressure pulse/shock wave generator (43) (shock wave head) and a control and power supply unit (41) for the shock wave head (43) connected via electrical cables (42) which may also include water hoses that can be used in the context of the present invention. However, as the person skilled in the art will appreciate, other set-ups are possible and within the scope of the present invention.

Figure 6:
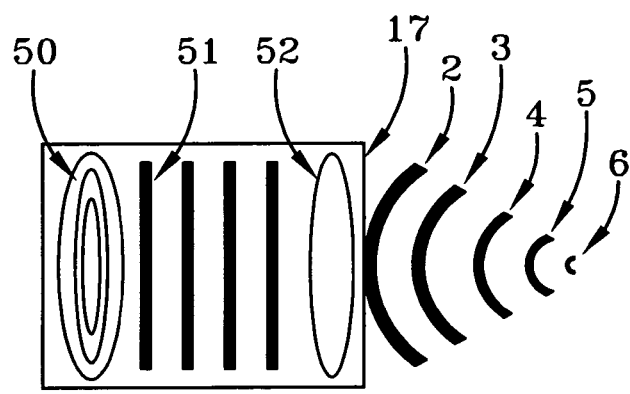
FIG. 6 is a simplified depiction of a pressure pulse/shock wave generator comprising a flat EMSE (electromagnetic shock wave emitter) coil system to generate nearly plane waves as well as an acoustic lens. Convergent wave fronts are leaving the housing via an exit window.

FIG. 6 is a simplified depiction of the pressure pulse/shock wave generator (shock wave head) having an electromagnetic flat coil 50 as the generating element. Because of the plane surface of the accelerated metal membrane of this pressure pulse/shock wave generating element, it emits nearly plane waves which are indicated by lines 51. In shock wave heads, an acoustic lens 52 is generally used to focus these waves. The shape of the lens might vary according to the sound velocity of the material it is made of. At the exit window 17 the focused waves emanate from the housing and converge towards focal point 6.

Figure 7:
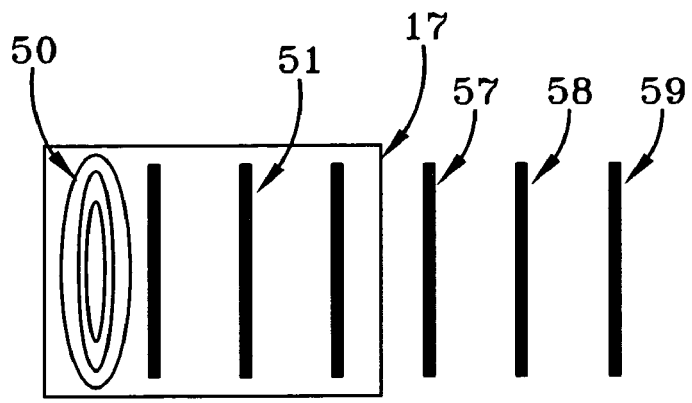
FIG. 7 is a simplified depiction of a pressure pulse/shock wave generator having a flat EMSE coil system to generate nearly plane waves. The generator has no reflecting or focusing element. As a result, the pressure pulse/shock waves are leaving the housing via the exit window unfocused having nearly plane wave characteristics.

FIG. 7 is a simplified depiction of the pressure pulse/shock wave generator (shock wave head) having an electromagnetic flat coil 50 as the generating element. Because of the plane surface of the accelerated metal membrane of this generating element, it emits nearly plane waves which are indicated by lines 51. No focusing lens or reflecting lens is used to modify the characteristics of the wave fronts of these waves, thus nearly plane waves having nearly plane characteristics are leaving the housing at exit window 17.

Figure 8:
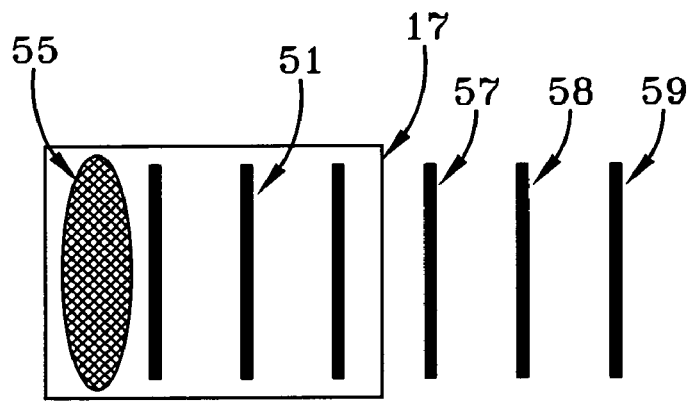
FIG. 8 is a simplified depiction of a pressure pulse/shock wave generator having a flat piezoceramic plate equipped with a single or numerous individual piezoceramic elements to generate plane waves without a reflecting or focusing element. As a result, the pressure pulse/shock waves are leaving the housing via the exit window unfocused having nearly plane wave characteristics.

FIG. 8 is a simplified depiction of the pressure pulse/shock wave generator (shock wave head) having an piezoceramic flat surface with piezo crystals 55 as the generating element. Because of the plane surface of this generating element, it emits nearly plane waves which are indicated by lines 51. No focusing lens or reflecting lens is used to modify the characteristics of the wave fronts of these waves, thus nearly plane waves are leaving the housing at exit window 17. Emitting surfaces having other shapes might be used, in particular curved emitting surfaces such as those shown in FIGS. 4a to 4c as well as spherical surfaces. To generate waves having nearly plane or divergent characteristics, additional reflecting elements or lenses might be used. The crystals might, alternatively, be stimulated via an electronic control circuit at different times, so that waves having plane or divergent wave characteristics can be formed even without additional reflecting elements or lenses.

Figure 9:
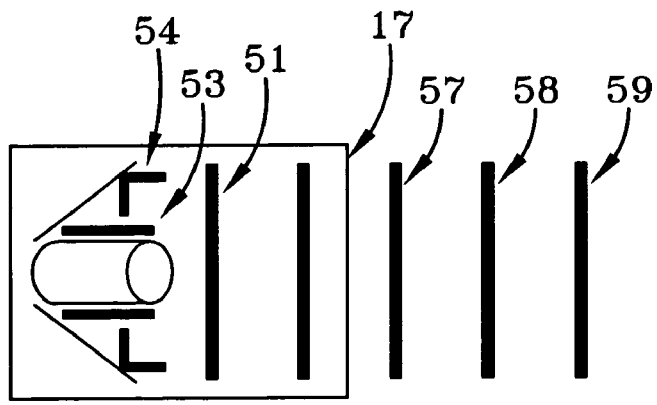
FIG. 9 is a simplified depiction of a pressure pulse/shock wave generator having a cylindrical EMSE system and a triangular shaped reflecting element to generate plane waves. As a result, the pressure pulse/shock waves are leaving the housing via the exit window unfocused having nearly plane wave characteristics.

FIG. 9 is a simplified depiction of the pressure pulse/shock wave generator (shock wave head) comprising a cylindrical electromagnet as a generating element 53 and a first reflector having a triangular shape to generate nearly plane waves 54 and 51. Other shapes of the reflector or additional lenses might be used to generate divergent waves as well.

Figure 10:
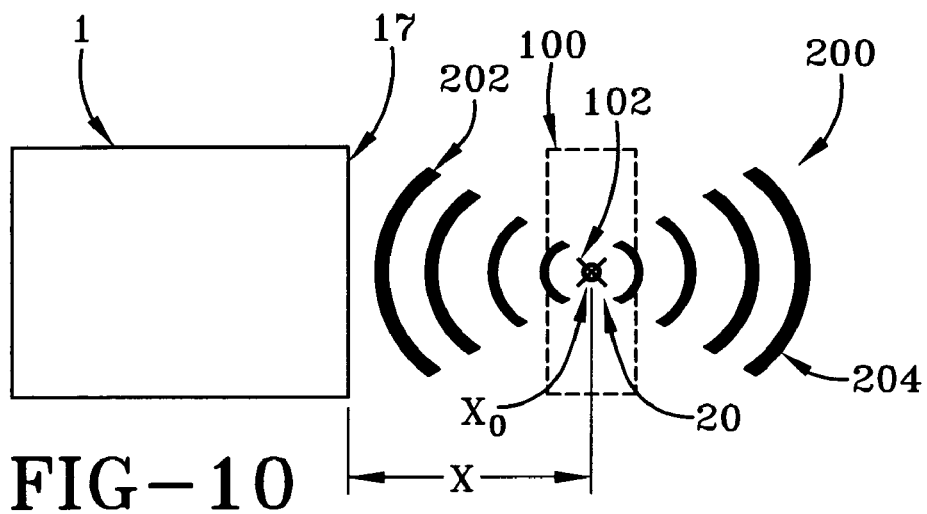
FIG. 10 is a simplified depiction of a pressure pulse/shock wave (PP/SW) generator with focusing wave characteristics shown focused with the focal point or geometrical focal volume being on a substance, the focus being targeted on the location $X_0$.
Figure 11:
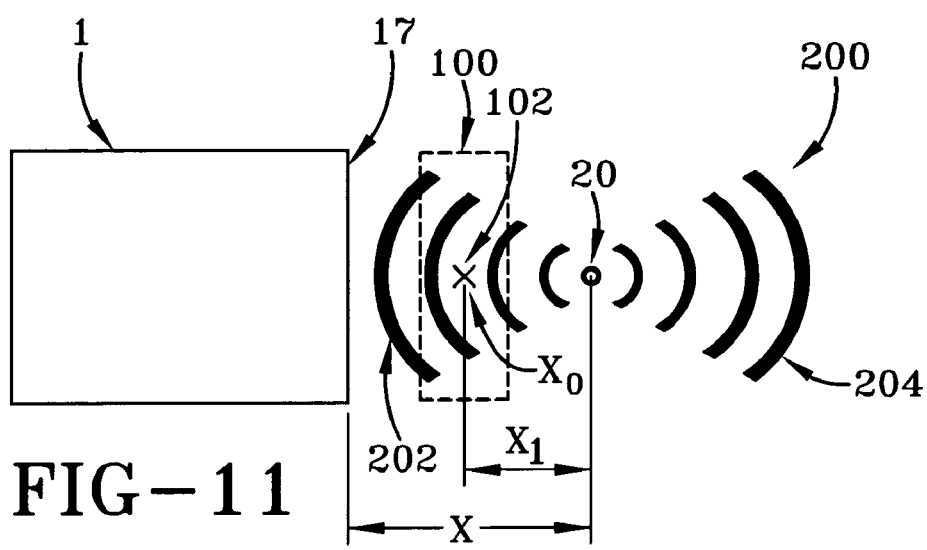
FIG. 11 is a simplified depiction of a pressure pulse/shock wave (PP/SW) generator with the focusing wave characteristics shown wherein the focus is located a distance $X_1$ from the location $X_0$ of a substance wherein the converging waves impinge the substance.
Figure 12:
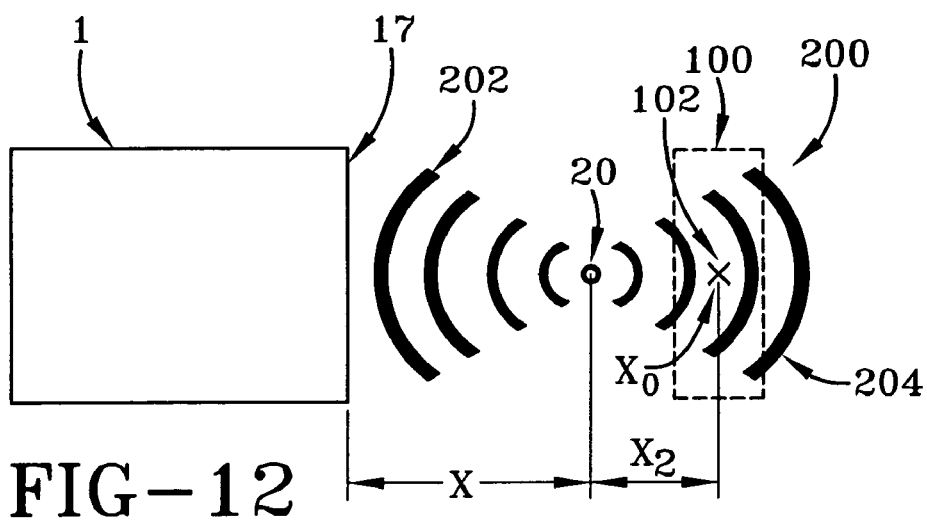
FIG. 12 is a simplified depiction of a pressure pulse/shock wave (PP/SW) generator with focusing wave characteristics shown wherein the focus is located a distance $X_2$ from the location $X_0$ wherein the emitted divergent waves impinge the substance.

With reference to FIGS. 10, 11 and 12 a schematic view of a shock wave generator or source 1 is shown emitting a shock wave front 200 from an exit window 17. The shock wave front 200 has converging waves 202 extending to a focal point or focal geometric volume 20 at a location spaced a distance X from the generator or source 1. Thereafter the wave front 200 passes from the focal point or geometric volume 20 in a diverging wave pattern as has been discussed in the various other FIGS. 1-9 generally.

With particular reference to FIG. 10 a plant tissue 100 is shown generally centered on the focal point or volume 20 at a location $X_0$ within the tissue 100. In this orientation the emitted waves are focused and thus are emitting a high intensity acoustic energy at the location $X_0$. This location $X_0$ can be anywhere within or on the tissue 100.

With reference to FIG. 11, the plant tissue 100 is shifted a distance X toward the generator or source 1. The tissue 100 at location $X_0$ being positioned a distance $X-X_1$ from the source 1. This insures the tissue 100 is impinged by converging waves 202 but removed from the focal point 20. When the tissue 100 is impacted, this bombardment of converging waves 202 stimulates the cells activating the desired response as previously discussed.

With reference to FIG. 12, the tissue 100 is shown shifted or located in the diverging wave portion 204 of the wave front 200. As shown $X_0$ is now at a distance $X_2$ from the focal point or geometric volume 20 located at a distance X from the source 1. Accordingly $X_0$ is located a distance $X+X_2$ from the source 1. As in FIG. 10 this region of diverging waves 204 can be used to stimulate the tissue 100 which when the tissue is a cellular tissue stimulates the cells to produce the desired growth effect or response.

As shown in FIGS. 1-12 the use of these various acoustic shock wave forms can be used separately or in combination to achieve the desired effect of stimulating growth.

Furthermore such acoustic shock wave forms can be used in combination with chemical treatments, gene therapy or cloning or plant grafting or cross pollination methods and when so combined the stimulated cells will more rapidly grow increasing productivity and potentially improving yields.

The present invention provides an apparatus for an effective treatment of plant tissues, which benefit from high or low energy pressure pulse/shock waves having focused or unfocused, nearly plane, convergent or even divergent characteristics. With an unfocused wave having nearly plane, plane, convergent wave characteristic or even divergent wave characteristics, the energy density of the wave may be or may be adjusted to be so low that side effects including cellular membrane damage do not exist at all.

In certain embodiments, the apparatus of the present invention is able to produce waves having energy density values that are below 0.1 mJ/mm2 or even as low as 0.000 001 mJ/mm2. In a preferred embodiment, those low end values range between 0.1-0.001 mJ/mm2. With these low energy densities, side effects are reduced and the dose application is much more uniform. Additionally, the possibility of harming surface tissue is reduced when using an apparatus of the present invention that generates unfocused waves having planar, nearly plane, convergent or divergent characteristics and larger transmission areas compared to apparatuses using a focused shock wave source that need to be moved around to cover the treated area. The apparatus of the present invention also may allow the user to make more precise energy density adjustments than an apparatus generating only focused shock waves, which is generally limited in terms of lowering the energy output.

The treatment of the above mentioned plant tissue or body of a plant is believed to be a first time use of acoustic shock wave therapy. None of the work done to date has treated the above mentioned plant treatments with convergent, divergent, planar or near-planar acoustic unfocused shock waves of low energy or high energy focused shock waves in a transmission path from the emitting source lens or cover to the target site.

It will be appreciated that the apparatuses and processes of the present invention can have a variety of embodiments, only a few of which are disclosed herein. It will be apparent to the artisan that other embodiments exist and do not depart from the spirit of the invention. Thus, the described embodiments are illustrative and should not be construed as restrictive.

The use of acoustic shock waves to plant tissue stimulates a cellular response of the treated tissues as well as a cellular response in any surrounding tissue. This response activates otherwise dormant cells to increase the plant's growth mechanisms, allowing the cells to rapidly replicate to initiate the growth process.

A further benefit of the use of acoustic shock waves is there are no known adverse indications when combined with the use of other nutrients. In fact the activation of the cells exposed to shock wave treatments only enhances cellular absorption of such nutrients making them faster acting than when compared to non stimulated cells. As a result, it is envisioned that the use of one or more nutrients prior to, during or after subjecting the plant tissue to acoustic shock waves will be complimentary to the treatment or pre-conditioning treatment. It is further appreciated that certain uses of pesticides can be altered or modified to lower risk or adverse side effects when combined with a treatment involving acoustic shock waves as described above.

Another aspect of the present invention is the use of acoustic shock waves can be combined with organic food farming. The treatment does not require genetic alteration or manipulation to accelerate the otherwise natural growth of plant tissue as such the use of acoustic shock waves is compatible with organic farming practices as well as the new fields of genetic engineering.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. The method of stimulating a plant substance, the plant substance being a tissue having cells with cellular membranes, comprises the steps of:

activating a pressure pulse or an acoustic shock wave generator or source to emit pressure pulses or acoustic shock waves wherein the pressure pulses or acoustic shock waves are acoustic pulses which include several cycles of positive and negative pressure, the amplitude of the positive part of such a cycle being above 0.1 MPa having rise times of the positive part of the first pressure cycle amplitude being below 100's of ns and the duration being below 1 to 3 micro-seconds (µs) for the positive part of a cycle and above some micro-seconds for the negative part of a cycle; and subjecting the plant substance to the pressure pulses or acoustic shock waves stimulating said substance with convergent, divergent, planar or near planar acoustic shock waves or pressure pulses in the absence of a focal point impinging the plant substance stimulating a cellular response in the absence of creating cavitation bubbles evidenced by not experiencing the sensation of rupturing cellular membranes of the cells caused by the emitted waves or pulses in the cellular tissue of the plant substance wherein the substance is positioned within a path of the emitted pressure pulses or shock waves away from any localized geometric focal volume or point of the emitted shock waves wherein the emitted shock waves or pressure pulses either have no geometric focal volume or point or have a focal volume or point ahead of the plant substance or beyond the plant substance thereby passing the emitted waves through the plant substance while avoiding having any localized focal point within the plant substance wherein the emitted pressure pulses or shock waves are convergent, divergent, planar or near planar and the pressure pulse shock wave generator or source is based on electro-hydraulic, electromagnetic, piezoceramic or ballistic wave generation having an energy density value ranging as low as 0.00001 mJ/mm$^2$ to a high end of below 1.0 mJ/mm$^2$, the stimulation having a dosage duration between a few seconds to 20 minutes or greater at an energy density in the range of 0.00001 mJ/mm$^2$ to 1.0 mJ/mm$^2$ per shock wave or less while avoiding or minimizing cell or membrane damage or rupturing by not creating cavitation bubbles in the tissue of the plant substance.

2. The method of stimulating a substance of claim 1 wherein the emitted pulses or shock waves are divergent or near planar having no geometric focal volume or point impinging the plant substance.

3. The method of stimulating a substance of claim 1 wherein the emitted pulses or shock waves are convergent having a geometric focal volume or point at a distance of at least X from the generator or source, the method further comprising positioning the substance at a distance less than the distance X from the source so as to avoid having a geometric focal volume or point impinging the plant substance.

4. The method of stimulating a plant substance of claim 1 wherein the tissue is one or more seeds of a plant.

5. The method of stimulating a plant substance of claim 4 wherein the plant is a tree.

6. The method of stimulating a plant substance of claim 4 wherein the plant is a bush.

7. The method of stimulating a plant substance of claim 4 wherein the plant is a vegetable.

8. The method of stimulating a plant substance of claim 4 wherein the plant is cotton.

9. The method of stimulating a plant substance of claim 4 wherein the plant is soybean.

10. The method of stimulating a plant substance of claim 4 wherein the plant is a flower.

11. The method of stimulating a plant substance of claim 1 wherein the plant is a tuber.

12. The method of stimulating a plant substance of claim 1 wherein the tissue is one or more somatic embryos.

13. The method of stimulating a plant substance of claim 1 wherein the plant is asexually propagated.

14. The method of stimulating a plant substance of claim 13 wherein the plant is grafted.

15. The method of stimulating a plant substance of claim 13 wherein the plant is vegetative propagated by the rooting of cuttings.

16. The method of stimulating a plant substance of claim 13 wherein the plant tissue is micro-propagated from somatic embryos in vitro from minute pieces of tissue or individual cells.

17. The method of stimulating a plant substance of claim 1 wherein the tissue is a part of the root system.

18. The method of stimulating a plant substance of claim 1 wherein the tissue is a clone of the genetic system of a plant species.

19. The method of stimulating a plant substance of claim 1 wherein the tissue is one or more zygotic embryos.

* * * * *